D. STURGIS.
Straw Cutter.
No. 79,513.  Patented June 30, 1868.
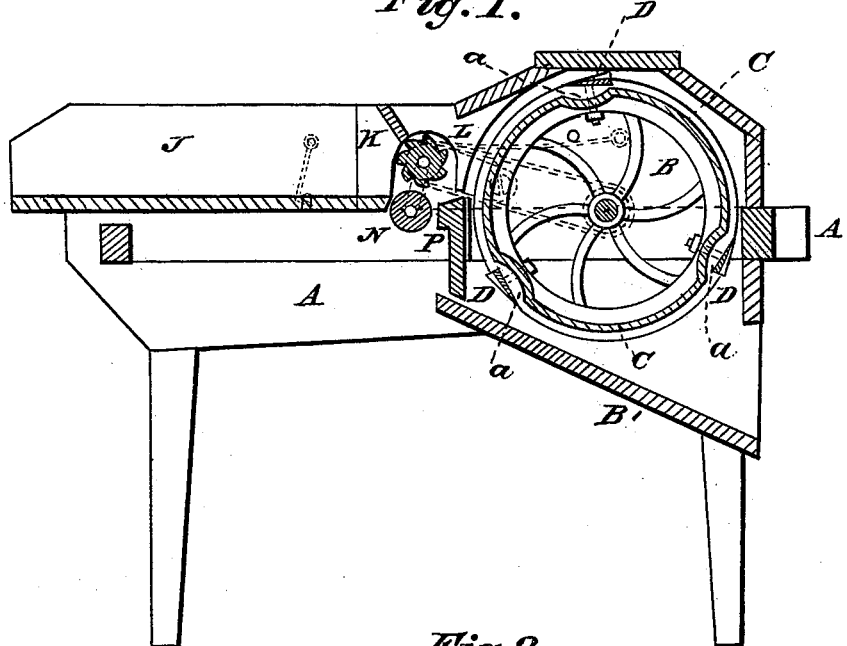
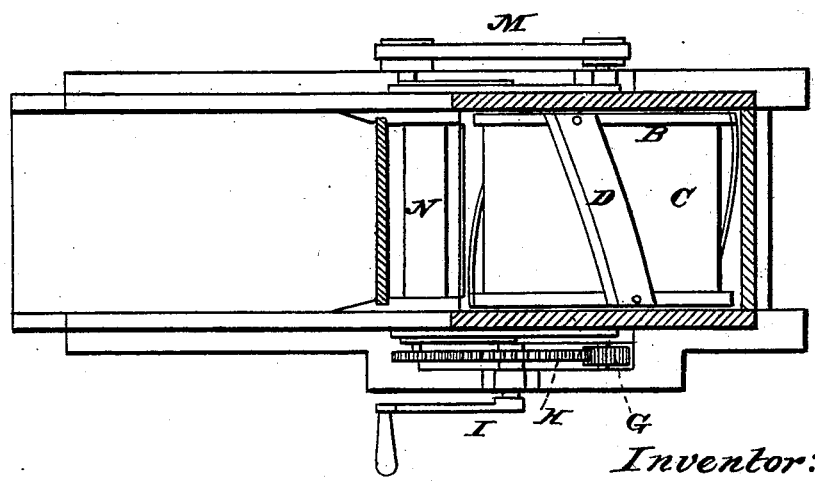
Witnesses:
V. D. Stockbridge
C. H. Blue
Inventor:
D. Sturgis
per
Alexander F. Mason
Atty.

United States Patent Office.

D. STURGIS, OF BYRON, ASSIGNOR TO HIMSELF AND M. THATCHER, OF SHIAWASSEE, MICHIGAN.

Letters Patent No. 79,513, dated June 30, 1868; antedated June 27, 1868.

IMPROVEMENT IN STRAW-CUTTERS.

*The Schedule referred to in these Letters Patent and making part of the same.*

TO ALL WHOM IT MAY CONCERN:

Be it known that I, D. STURGIS, of Byron, in the county of Shiawassee, and in the State of Michigan, have invented certain new and useful Improvements in Straw-Cutters; and do hereby declare that the following is a full, clear, and exact description thereof, reference being had to the accompanying drawings, and to the letters of reference marked thereon.

In the annexed drawings, making part of this specification, A represents the frame of a straw-cutter, which may be made of the usual dimensions, and supported upon suitable legs. The forward end of this frame is provided with an inclined bottom board, B', so that the straw or hay when cut will slide or pass readily away from it.

Lying crosswise of the frame, near its forward end, is a cylinder, which is provided with a suitable shaft, which shaft has its bearings in the frame. This cylinder is composed of two cast-iron heads, separated twelve inches from each other, and provided between them with a sheet-iron band, C. This band forms the periphery of the cylinder, but is dropped below the peripheries of the heads about two inches. The heads projecting thus above the band C, form rims, upon which the knives D are bolted. The knives D run diagonally across the cylinder, being secured at their ends to the rims of the heads. Immediately beneath the knives the band C is indented or provided with recesses, $a$, so that the cylinder will easily clear itself of the cut straw, which might otherwise pack.

Upon one end of the shaft of the cylinder is a pinion, G, and upon the other end is a pulley, around which passes a band, M.

The pinion G works into a gear-wheel, H, said wheel H being secured upon a short crank-shaft, which has its bearings in the frame A.

P represents a cross-piece in the frame, which lies close to the cylinder, and which is provided with a metallic cutter-plate, against or close to which the knives cut the straw.

N represents one of the feed-rollers, whose shaft lies across the frame A, having bearings in it. Upon one end of this shaft is a pulley, around which the belt M passes after leaving the pulley of the cylinder-shaft. This belt is crossed.

J represents a box, which at the same time forms a cover for the cylinder, and sides and bottom or the channel or way in which the straw lies as it is being fed to the cylinder. This box is made so that it rests upon the frame, is easily removable, being confined to said frame by means of suitable hooks.

The shaft of a feed-roller, K, lies in curved slots in this box, and is pressed downward by means of the springs L L. On one end of the shaft of this roller is a pinion, which gears into the gear-wheel H, which gives it motion. The two feed-rollers both revolve in the same direction. The lower roller is made plain, while the other is corrugated upon its periphery.

The cylinder is made heavy enough to answer the place of a balance-wheel.

The machine, by this construction, will cut easily when once in motion, and that, too, without any tendency to the straining of the cylinder-shaft.

Having thus fully described my invention, what I claim as new, and desire to secure by Letters Patent, is—

The arrangement of the cylinder, as constructed with the frame A, box J, and feed-rollers K and N, connected together and operating as and for the purpose set forth.

In testimony that I claim the foregoing, I have hereunto set my hand, this 14th day of October, 1867.

D. STURGIS.

Witnesses:
 DANIEL SHERWOOD,
 EZRA N. FAIRCHILD.